Figure 1:
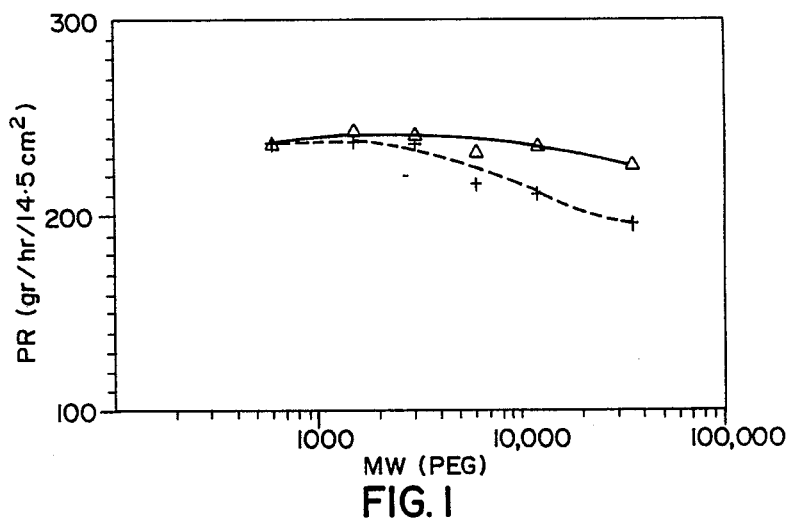

United States Patent [19]

Tweedle et al.

[11] Patent Number: 4,898,698
[45] Date of Patent: Feb. 6, 1990

[54] METHOD OF CASTING A POROUS MEMBRANE OF POLYMERIC MATERIAL

[75] Inventors: Thomas A. Tweedle, Orleans; Oleh Kutowy, North Gower; André Tremblay, Vanier, all of Canada

[73] Assignee: National Research Concil of Canada, Ottawa, Canada

[21] Appl. No.: 281,021

[22] Filed: Dec. 7, 1988

[30] Foreign Application Priority Data

Dec. 9, 1987 [CA] Canada .................................. 553861

[51] Int. Cl.$^4$ ...................... B29C 39/42; B29C 67/20
[52] U.S. Cl. .................................... 264/41; 264/216; 264/232; 264/299
[58] Field of Search .................. 264/41, 216, 232, 299

[56] References Cited

U.S. PATENT DOCUMENTS 4,744,807  5/1988  Minhas et al. .................... 264/41 X
4,772,440  9/1988  Kasi et al. .............................. 264/41

OTHER PUBLICATIONS

Xie-Quing, XV, "Additives for the Preparation of Polysulfone-based Ultrafiltration Membranes, especially for Hemodialysis and Hemo-Osmometer" in Desalination, 48(1983), 79–84, Elsevier Science Publishers B.V., Amsterdam.

Primary Examiner—Hubert C. Lorin
Attorney, Agent, or Firm—Francis W. Lemon

[57] ABSTRACT

A method of casting porous membranes of polymeric material is provided wherein the membrane has at least one of the following: a more homogeneous active skin layer for separation purposes with a lower molecular weight cut off, a more homogeneous active skin layer with a sharper molecular weight cut off curve, a relatively thinner active skin layer with a relatively greater flux for a given separation of a substance from a solution thereof, and relatively fewer imperfections through the active skin layer. The method comprises casting a layer of a casting solution on to a support, to provide a cast layer of the casting solution thereon with an exposed skin, then progressively submerging the cast layer in a gelation liquid at a relative velocity of at least 15 cm/second, whereby the exposed skin is gently scrubbed with gelation liquid to continuously remove outwardly diffusing solvent therefrom and dissipate exothermic heat, thus causing gelation of at least a stable, more homogeneous active skin layer, with build-up of a solvent boundary layer between the exposed surface of the layer and the gelation liquid minimized.

4 Claims, 2 Drawing Sheets

METHOD OF CASTING A POROUS MEMBRANE OF POLYMERIC MATERIAL

The process of porous membrane formation, from the formulation stage to the final leaching and post treatment, is quite complex. There are a multitude of variables which affect the ultimate performance of any particular membrane material. Until recently, most of the effort in the published literature had been devoted to studying the variables of cellulosic, porous membranes. Notable among these are the works of R. R. Kesting.

While the known processes for the formation of cellulosic, porous membranes have proved to be useful, there is still a need for a process for the formation of a porous membrane having a narrow pore size distribution. There is also a need for a process for the formation a porous membrane where the build-up of solvent between the exposed surface of the cast, cellulosic layer and the gelation liquid is minimized whereby a sharper molecular weight cut off curve for the membrane so produced is obtained.

Known processes for the formulation of porous membranes from noncellulosic materials, such as polysulfones, do not provide adequate control of the process variables as well as those in known processes for the production of cellulosic, porous membranes. The experimental results of tests made by the applicants for the production of porous membrane of, for example, polysulfone, were scattered and not reproducible to any degree of reliability. There are several reasons why this is the case. One of the most important reasons, with its obvious consequences, is that the casting solutions of polysulfones and solvents therefore, such as, for example, N-methyl pyrrolidone, may not form the same type of advantageous supermolecular aggregates in solution as those that are obtained by cellulose acetate with acetone as the solvent and water as the non-solvent gelation liquid.

It follows that not all of the variables that have been studied in producing cellulose acetate porous membranes are applicable to producing polysulfone porous membranes, and so new variables need to be dealt with for the production of polysulfone membranes.

One investigation of polysulfone casting solution compositions has been carried out for industrial applications and the results are given in Desalination, Xu, Xie-Qunig, 1983, 48 (1), 79. Gelatin of porous, polysulfone membranes has also been studied in more detail from a mechanistic viewpoint.

It has now been found that build-up of a solvent boundary layer between the exposed face side of the cast layer, and the gelation liquid, reduces the number of pores per unit area that are formed in a porous membrane; and that the build up is a source of imperfections.

There is a need for a method of casting a porous membrane wherein the number of pores per unit that are formed in the cast layer is not reduced by the build-up of a solvent boundary layer between the exposed side face of the cast layer of casting solutions and the gelation liquid.

Conventional thinking has been to cast the casting solution and then introduce the cast solution into the gelation liquid all at the same rate of, for example, about 0.05 to 0.2 m/second. The reason why the cast layers have been introduced into the gelation liquid at this slow rate has been to avoid any damage, e.g. deformation which may be in the formation of ripples, to the very fragile layer of casting solution, which is in liquid form, by any significant turbulence in the gelation liquid.

The applicants have now found that the cast layer can be brought into contact, at a high rate with the gelation liquid, and that physical deformation of the cast layer, or uneven gelation thereof, is substantially unaffected by turbulence in the gelation liquid, resulting in membranes having surprisingly enhanced properties.

According to the present invention there is provided a method of casting a porous membrane of polymeric material, comprising:

(a) casting a layer of a casting solution on to a support to provide a cast layer of the casting solution thereon with an exposed skin, the casting solution comprising
  (i) a polymeric material capable of gelation from the casting solution by a gelation liquid to form a porous membrane, and
  (ii) an aprotic solvent for the polymeric material, which will be slowly diffused from the casting solution by the gelation liquid, the aprotic solvent having a relatively high exothermic heat of mixing with the gelation liquid and being selected from the group consisting of N-Methyl Pyrrolidinone, Dimethyl Acetamide, Dimethyl Sulfoxide, Dimethyl Formamide and Butyrolactone.

(b) progressively submerging the cast layer in a gelation liquid at a relative surface velocity between the cast layer and the gelation liquid, of at least 15 cm/second, whereby the exposed skin is gently scrubbed with gelation liquid to continuously remove outwardly diffusing solvent therefrom and dissipate exothermic heat evolved by mixing of the diffusing solvent and the gelation liquid, (c) maintaining the cast layer submerged in the gelation liquid until gelatin of substantially the whole cast layer has occurred, (d) so that rapid entry of the gelation liquid into the cast layer occurs without solvent build-up recurring at the exposed surface, thus causing gelation of at least a stable, coherent, active skin layer on the exposed surface of the cast layer, with build-up of a solvent boundary layer between the exposed surface of the cast layer and the gelation liquid being minimized, whereby, a membrane is formed having at least one of the following:
  (i) a more homogeneous active skin layer with a lower molecular weight cut off point,
  (ii) a more homogeneous active skin layer with a sharper molecular weight cut off curve,
  (iii) a relatively thinner active skin layer with a relatively greater flux for a given separation of as substance from a solution thereof, and
  (iv) relatively fewer imperfections throughout an active skin layer.

Preferably the bringing of the exposed surface into contact with gelation liquid is continued at the relative rate of at least 15 cm per second to maintain the scrubbing action until a substantial amount of solvent has been removed and gelation of substantially the whole cast layer has occurred.

In some embodiments of the present invention the cast layer is brought into contact with the gelation liquid at a relative surface velocity between the cast layer and the gelation liquid of at least about 20 cm per second.

In other embodiments of the present invention, a membrane pore forming additive is included in the casting solution.

In this specification, gelation of a stable, more homogenous active skin layer means;
(i) the skin layer is stable during the entire gelation period in that it is resistant to the formation therein of imperfections due to preferential channelling therethrough of solvent to the exposed surface from ungelled casting solution,
(ii) the skin is homogeneous and continuous.
(iii) the skin is active in that it is the porous barrier responsible for transmembrane permeation of carrier fluid, for example, water and the separation of species therethrough, for example, a more concentrated macromolecular solution of polyethyleneglycol from a more dilute solution thereof in water.

Further, in this specification "solvent boundary layer" means the layer of solvent rich solution adjacent to the precipitated polymer skin layer formed immediately after initial gelation liquid (for example) water/casting solution contact, and remaining until substantially all solvent is depleted from the precipitated polymer by the moving gelation bath.

Figure 2:
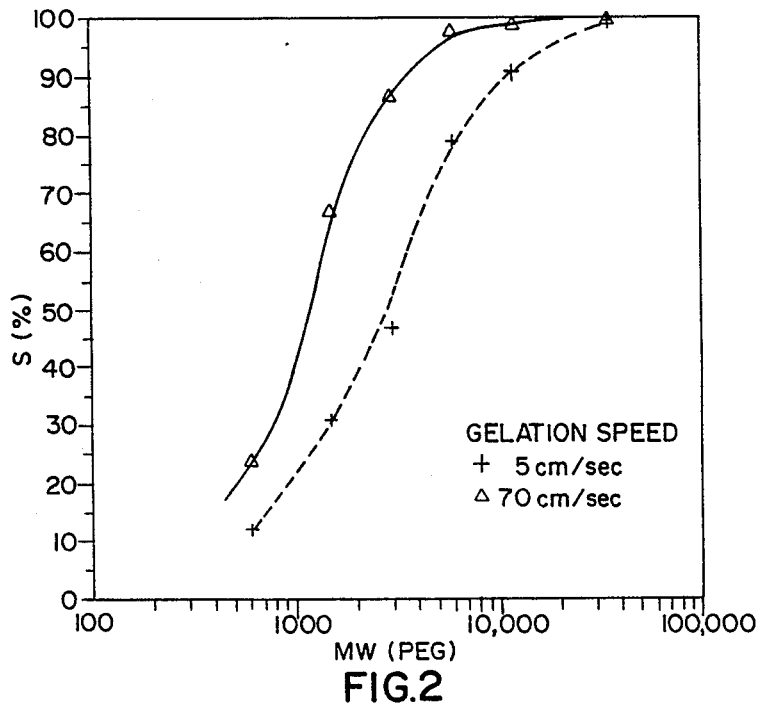
Figure 3:
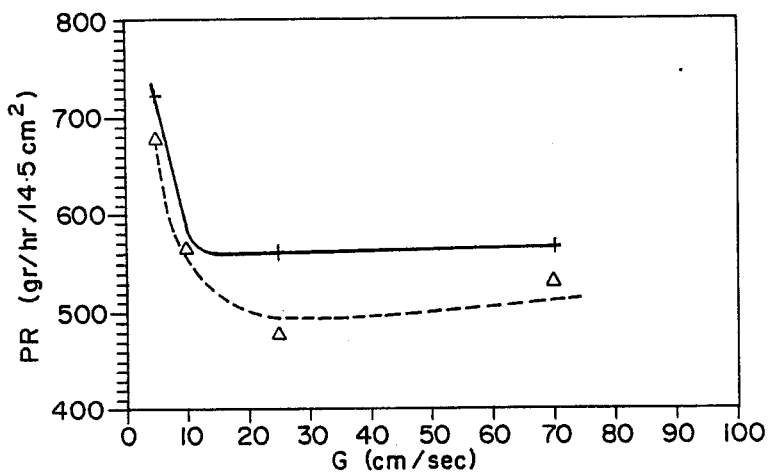
Figure 4:
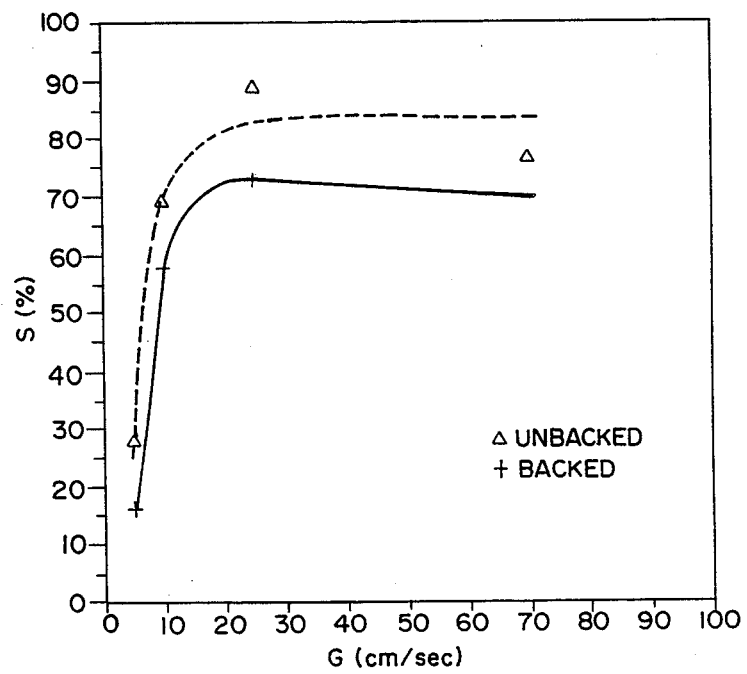

In the accompanying drawings, which illustrate, in graph form, the results of tests to verify the present invention, FIG. 1 is a graph of different molecular weights polyethylene glycols separated from water by a porous membrane of polyether sulfone plotted against the Permeation Rate, FIG. 2 is a similar graph to FIG. 1 but of the molecular weights plotted against the separation, FIG. 3 is a graph of the gelation sheets of porous membranes of polyether sulfone plotted against water permeation rate, and FIG. 4 is a similiar graph to FIG. 3 but of the gelation speed plotted against the separation.

In tests to verify the present invention, the film casting solutions, consisting of specified amounts of a polymer and a polar aprotic solvent for the polymer, with or without membrane pore forming additives, were made by the gentle tumbling method, without heat unless the solution was too viscous to dissolve unaided within one week. The films were cast on glass plates or on spun polyethylene paper under the following conditions: the casting temperature was 22° C., the casting atmosphere was ambient air, the gelation bath was at a temperature of 2° C. unless otherwise stated. The casting was performed at controlled speeds between 1 cm per second and 10 cm per second, the cast films were held in air for an average time of 15 seconds and then gradually lowered into a gelation bath of iced water at controlled speeds of about 2 cm to 80 cm per second along an inclined support. After a 15 minute gelation period in the iced water, the membranes were removed from iced water and extensively leached for at least one day in water at room temperature. Data on membrane performance was obtained from UF experiments on conventional high mass transfer test cells using 200 ppm aqueous polyethyleneglycol solutions at 345 kPag (50 psig).

The effect of rate of entry (RE) of a cast solution into a gelation bath was first tested with a particular polysulfone formulation. Further tests were then carried out to determine which of the components of the casting solution could be responsible for improving the permeation rate (PR) i.e. the rate of separation of the polyethyleneglycol from water, or the % separation S(%), i.e. the % separation of polyethyleneglycol from water.

$$S(\%) = \frac{\text{(feed concentration)} - \text{(permeate concentration)}}{\text{feed concentration}} \times 100\%$$

The additive was varied in amount and type, the solvent was changed and finally the polymer was changed. The solvent used in the tests were N-methyl pyrrolidinone (NMP) from Baker, dimethylacetamide (DMA) from Anachemia and acetone (ACr) laboratory grade. The polymers studied were polysulfone (PS) from Union Carbide, polyamide (PA) laboratory made, cellulose acetate (CA) from Eastman Kodak, polyacrylonitrile (PAN) and polyvinylidine fluoride (PVF) from polysciences. Additives in formulations were polyvinylpyrrolidinone (PVP), polyetheleneglycol (PEG), perchlorate $Mg(ClO_4)_2$ and calcium chloride $(CaCl)_2$. All of the inorganic materials used were of reagent grade and all of the materials were used in the condition that they were received without further purification. Spun bonded polyester backing materials, when used, were obtained from Eaton Dickman Litter Co., and spun bonded polyethylene backing materials, when used, were obtained from Dupont.

Typical results of these lists are given in the graphs shown in FIGS. 1 to 4.

In FIGS. 1 and 2, the molecular weights MW(PEG) of different polyethylene glycols separated from water by a porous membrane of polyether sulfone marketed under the trademark VICTREX by Imperial Chemical Industries, England, are plotted against the Permeation Rate, designated PR (gr/hr/14.5 cm$^2$), and Separation, designated S(%), respectively, —+— designates a rate of entry (RE) of 5 cm/sec, while ----△---- designates a rate of entry (RE) of 70 cm/sec.

In FIGS. 3 and 4 the gelation G(cm/sec) of porous membranes of polyether sulfone marketed under the trademark VICTREX by Imperial Chemical Industries are plotted against water Permeation Rate PR (gr/hr/14.5 cm$^2$) and Separation S(%), respectively, for the same tests as those for FIGS. 1 and 2, and —△— designates films cast in glass with no backing while ----+---- designates films cast on spun bonded polyethylene paper as a permanent backing.

The tests showed that in some instance an increase in productivity is obtained with a more rapid rate of entry into the gelation bath, with essentially the same separation, and in other instance essentially the same productivity was obtained with improved separation. This can be attributed to an exposed surface skin on the cast layer being gently scrubbed with gelation liquid at velocities of at least 15cm/second to continuously remove outwardly diffusing solvent therefrom and dissipate exothermic heat evolved by mixing of the diffusing solvent and gelation liquid. It was noted that the change in performance, be it separation or productivity, is not linear with respect to the rate of entry into the gelation bath. A marked improvement was found to be obtained at the rate of entry into the gelation bath of about 15 cm/second, but the change was found to level off at a rate of entry into the gelation bath above about 20 cm second. However, greater rates of entry were found to further reduce the undesirable effects of surface turbulence of the gelatin liquid.

In order to better confirm the understanding of the general cause-effect relationships of the rate of entry of the cast solution into the gelatin liquid, a number of selected polymers and solvents were used in conventional (slow) cm/sec. entry, and at 70 cm/sec. entry rates according to the present invention. Typical results are given in the following table I.

TABLE I

| Polymer | Solvent | Additive | ENTRY INTO GELATION BATH | | | | |
|---|---|---|---|---|---|---|---|
| | | | 5 cm/second | | 70 cm/second | | |
| | | | PR gm/hr | % Sep | PR gm/hr | % Sep | Solute |
| CA | NMP | — | 75 | 32 | 153 | | |
| CA | NMP | PVP | 86 | 32 | 114 | 30 | |
| PA | DMA | liCl | 731 | 23 | 796 | 59 | |
| PAN | NMP | PVP | 554 | 4 | 560 | 5 | |
| PVF | DMA | — | 300 | 65 | 249 | 37 | |
| PS | DMA | — | 754 | 30 | 640 | 54 | |
| PS | DMA | PVP | 560 | 27 | 636 | 32 | |

In contrast to the results given in Table I, when cellulose acetate polymer was used with acetone as the solvent, and $Mg(ClO_4)_2$/Water as the pore former, there was no apparent significant difference in the performance of the resultant membrane when tested with NaCl solution. This does not rule out the possibility of a sharper or more uniform pore size distribution which was noted in the other materials.

It can be seen that the DMA (with and without the PVP additive) performed in a manner similar to the NMP casting solution in that without the additive the productivity increased about 14% and the selectivity increased slightly, while with the additive in the casting solution a 15% drop in productivity was accompanied by a significant increase in permeability.

What we claimed is;

1. A method of casting a porous membrane of polymeric material, comprising:
   (a) casting a layer of a casting solution on to a support to provide a cast layer of the casting solution thereon with an exposed skin, the casting solution comprising
      (i) a polymeric material capable of gelation from the casting solution by a gelation liquid to form a porous membrane, and
      (ii) an aprotic solvent for the polymeric material, which will be slowly diffused from the casting solution by the gelation liquid, the aprotic solvent having a relatively high exothermic heat of mixing with the gelation liquid and being selected from the group consisting of N-Methyl Pyrrolidinone, Dimethyl Acetamide, Dimethyl Sulfoxide, Dimethyl Formamide and Butyrolactone,
   (b) progressively submerging the cast layer in a gelation liquid water at a relative surface velocity between the cast layer and the gelation liquid of at least 15 cm/second, whereby the exposed skin is gently scrubbed with gelation liquid to continuously remove outwardly diffusing solvent therefrom and dissipate exothermic heat evolved by mixing of the diffusing solvent and the gelation liquid,
   (c) maintaining the cast layer submerged in the gelation liquid until gelation of substantially the whole cast layer has occurred,
   (d) so that rapid entry of the gelation liquid into the cast layer occurs without solvent build-up recurring at the exposed surface, thus causing gelation of at least a stable, coherent active skin layer on the exposed surface of the cast layer, with build-up of a solvent diffusing layer between the exposed surface of the cast layer and the gelation liquid being minimized, whereby a membrane is formed having at least one of the following:
      (i) a more homogeneous active skin layer with a lower molecular weight cut off point,
      (ii) a more homogeneous active skin layer with a sharper molecular weight cut off,
      (iii) a relatively thinner active skin layer with a relatively greater flux for a given separation of a substance from a solution thereof, and
      (iv) relatively fewer imperfections throughout an active skin layer.

2. A method according to claim 1, wherein the bringing of the exposed surface into contact with gelation liquid is continued at a relative rate of at least 15 cm per second to maintain the scrubbing action until a substantial amount of solvent has been removed and gelation of substantially the whole cast layer has occurred.

3. A method according to claim 1, wherein the cast layer is brought into contact with the gelation liquid at a relative surface velocity between the cast layer and the gelation liquid of at least about 20 cm per second.

4. A method according to claim 1, wherein the casting solution contains a membrane pore forming additive.

* * * * *

UNITED STATES PATENT AND TRADEMARK OFFICE
CERTIFICATE OF CORRECTION

PATENT NO. : 4,898,698
DATED : February 6, 1990
INVENTOR(S) : Tweddle et al

It is certified that error appears in the above-identified patent and that said Letters Patent is hereby corrected as shown below:

On the front sheet

[75] correct the spelling of the surname of Thomas A. Tweddle, and correct the accent on André Tremblay, and

[19] "Tweedle" should read --Tweddle--

[73] correct the spelling of "Council" in the name National Research Council of Canada.

Signed and Sealed this

Eleventh Day of December, 1990

*Attest:*

HARRY F. MANBECK, JR.

*Attesting Officer*     *Commissioner of Patents and Trademarks*